United States Patent [19]
Mundy

[11] 3,817,484
[45] June 18, 1974

[54] DISPLAY UNIT MOUNTING MEANS
[75] Inventor: Anthony Charles Mundy, Cuxton, England
[73] Assignee: Elliott Brothers (London) Limited, Chelmsford, Essex, England
[22] Filed: May 18, 1972
[21] Appl. No.: 254,623

[30] Foreign Application Priority Data
June 4, 1971 Great Britain.................18929/71

[52] U.S. Cl. ............................................ 248/278
[51] Int. Cl.......................................... F16m 13/00
[58] Field of Search........ 108/4, 7, 9; 248/183, 184, 248/188.4, 278, 371

[56] References Cited
UNITED STATES PATENTS
| | | | |
|---|---|---|---|
| 1,457,982 | 6/1923 | Makower............................ | 248/183 |
| 2,321,652 | 6/1943 | Carliss ............................ | 248/346 X |
| 2,463,648 | 3/1949 | Schultz ............................ | 248/183 |
| 3,156,196 | 11/1964 | Hood ................................ | 108/4 |
| 3,215,391 | 11/1965 | Storm........................... | 248/184 X |
| 3,288,421 | 11/1966 | Peterson ............................ | 108/4 X |

FOREIGN PATENTS OR APPLICATIONS
159,189   3/1933   Switzerland........................ 248/278

Primary Examiner—William H. Schultz
Attorney, Agent, or Firm—Kirschstein, Kirschstein, Ottinger & Frank

[57] ABSTRACT

A mounting means, for a display unit, in which fixing means for securing the mounting means to an associated assembly comprises a bearing which serves to constrain the mounting means to rotational movement about a centre fixed with respect to the associated assembly, and a plurality of links of adjustable length each attached at one end to the mounting means at a point remote from the bearing, and each fixed at the other end to the associated assembly to lie transversely to the bearing so that adjustment of the lengths of the links adjusts the angular position of the mounting means, and hence the display unit, about said centre of rotation.

4 Claims, 3 Drawing Figures

DISPLAY UNIT MOUNTING MEANS

The present invention relates to mounting means for display units, and particularly for head-up display units for use in aircraft.

In aircraft, particularly military aircraft, it is well known to use display units of the cathode ray tube type which project their picture onto a combiner through which the pilot can see. The combiner typically comprises a semi-reflective plate. The projected display thus appears superposed on the scene which the pilot sees directly through the cockpit windows. It is obvious that the projected display must be accurately alined with the directly viewed scene. This can be achieved by electronic means, shifting the display, but this is unsatisfactory for various reasons. The other way of adjustment is by mechanical means, and this has been achieved by forming the display unit with a surface forming part of a sphere of large radius, forming a corresponding surface on the airframe, and providing clamping means so that the display unit can be moved and rotated over the fixed spherical surface until it is correctly positioned, and then clamped.

This mechanical arrangement however also suffers from certain disadvantages. The size and shape of the required mechanism is inconvenient, and the process of adjusting its position is tedious and difficult. The object of the present invention is to provide a mounting means for display units in which these disadvantages are alleviated or overcome.

According to the invention there is provided a mounting means for a display unit including fixing means for securing the mounting means to an associated assembly, the fixing means comprising a bearing which serves to constrain the mounting means, when secured to the associated assembly, to rotational movement about a center fixed with respect to the associated assembly; and three links of adjustable length each attached at one end to the mounting means and at the other end to the associated assembly, two of said links extending substantially parallel to one another in directions substantially at right angles to and spaced from a first of three mutually perpendicular axes passing through said center of rotation so that rotation of the mounting means about said first axis is controllable by adjustment of the lengths of both said two links together, one only of said two links extending in a direction substantially cutting a second of said axes so that rotation of the mounting means about said second axis is controllable by adjustment of the other of said two links alone, and the third link extending in a direction substantially at right angles to and spaced from the third of said axes so that rotation of the mounting means about said third axis is controllable by adjustment of the length of said third link alone.

An embodiment of the invention will now be described, by way of example, with reference to the accompanying drawings, in which.

Figure 1:
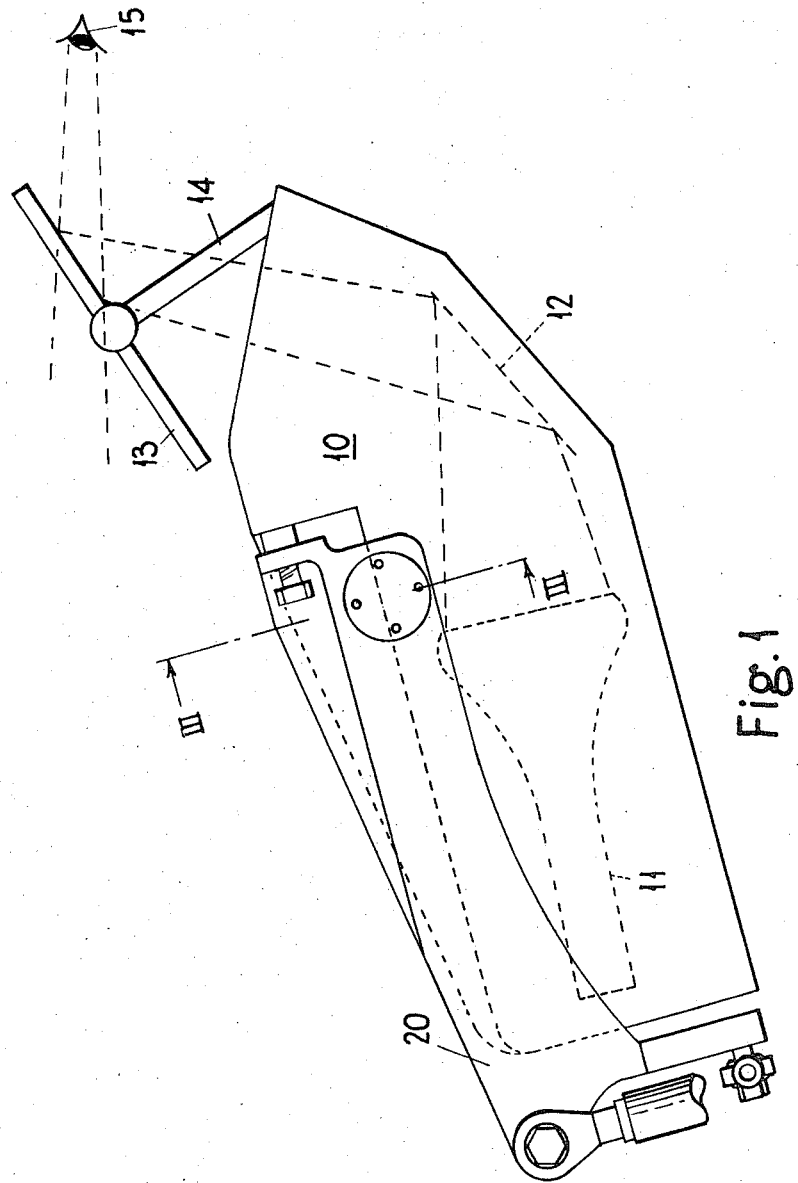
FIG. 1 is a general side view of a display unit mounted in a mounting means.

Referring first to FIG. 1, the display unit 10 includes a cathode ray tube 11 and a reflecting mirror 12 which (together with a lens system not shown) projects the picture on the face of the cathode ray tube 11 up onto a semireflecting combiner 13 mounted on supports 14. The pilot's eye 15 receives light from the scene in front of the aircraft, this light passing through the combiner 13, and also receives light from the mirror 12 reflected by the combiner 13. The display unit 10 is mounted in a mounting tray 20 which can be adjusted so as to adjust the elevation, azimuth, and roll of the image seen by the pilot, so that it can be adjusted to coincide with the scene seen directly.

Figure 2:
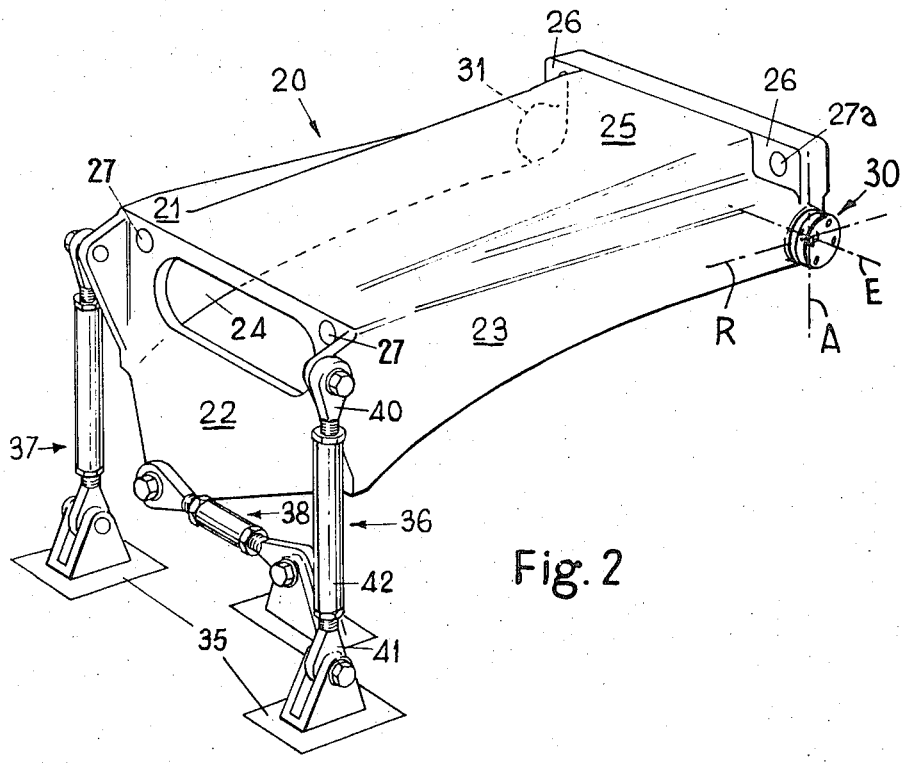
FIG. 2 is a perspective view of the mounting means.

The mounting means is shown in perspective view in FIG. 2. The main element consists of a tray 20 having a top 21, a back 22, and two partially cut-away sides 23 and 24. The top 21 has a raised ramp 25 formed in it, to accommodate the display unit. The back 22 is provided with two holes 27, and at the front end (opposite the back 22), the tray has two vertical ears 26 with holes 27a in them; the display unit 10 is mounted on the tray 20 by pins (not visible) on the display unit 10 which fit into the holes 27, and by bolts through the two holes 27a, as seen in FIG. 1. Also at this end of the tray, there is a spherical bearing 30 at the end of side 23 and a spherical clamp 31 at the end of side 24. As is explained further below, the bearing 30 serves to constrain the tray to rotational movement about a centre fixed with respect to the airframe.

At the back of the tray, there are three links 36, 37 and 38 each attached at one end to the tray by means of a spherical bearing and similarly attached at the other end to the airframe 35. Link 36 extends, from an attachment point on an extension of side 23, in a direction substantially at right angles to and spaced from an axis E through the spherical bearing 30, and cutting an axis R through the bearing 30, the axis E and R being the axes about which the tray 20 must be rotated to adjust elevation and roll respectively of the image seen by the pilot. Link 37 extends, from a similar attachment point on an extension of side 24, in a direction substantially parallel to link 36 and hence at right angles to and spaced from both the axis E and the axis R. Link 38 extends, from an attachment point on back 22, in a direction at right angles and spaced from an axis A through the bearing 30, the axis A being the axis about which the tray 20 must be rotated to adjust the azimuth of the image seen by the pilot. Link 36 consists or a rod 40 with a right-hand thread pivoted on the attachment point, a rod 41 with a left-hand thread pivoted on the airframe, and a tube 42 with internal right-hand and left-hand threads engaging with the rods 40 and 41 respectively. Thus rotation of the tube 42 lengthens or shortens the link. Links 37 and 38 have a similar construction.

Figure 3:
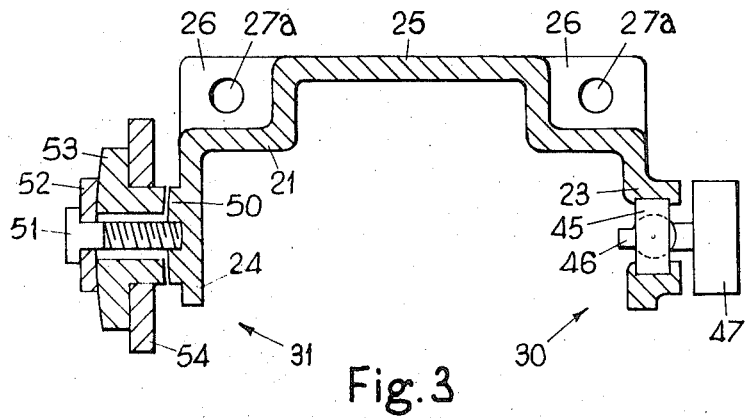
FIG. 3 is a simplified sectional view along the line III—III of FIG. 1.

The structure of the spherical bearing 30 is shown in FIG. 3. Side 23 of the mounting tray has a disc 45 mounted therein with a hole of spherical shape formed therein, and a co-operating globe 46 formed on a rod is mounted on a support 47 fixed to the airframe. The mounting tray 20 can therefore rotate in any direction about the spherical bearing.

The spherical bearings at the ends of the links 36, 37 and 38 are suitably of similar construction to the bearing 30. Thus the rods 40 and 41 of the link 36 and the corresponding rods of the links 37 and 38 are each suitably provided with a hole of spherical shape which co-operates with a globe formed on a rod secured to the airframe or mounting tray 20, as appropriate.

The spherical clamp 31 is formed on the opposite side 24 of the mounting tray. The side 24 has a spherical surface 50 formed on it, concentric with the centre of the spherical bearing 30, and a bolt 51 carries a washer 52 formed with a similarly concentric surface. A second washer 53 fits between the surface 50 and the washer 52, conforming with the two spherical surfaces; this washer 53 has a large bore hole through it and fits tightly in a support 54 fixed to the airframe. Thus with bolt 51 slack, the mounting means is free to be rotated within the limits set by the amount of freedom which bolt 51 has in the hole in washer 53; when bolt 51 is tightened, the mounting means is clamped in position. In use, it is so clamped after adjustment of the links 36, 37 and 38, to prevent relative movement between mounting means and airframe under vibration.

In use of the arrangement, the length of the link 38 is adjusted to adjust the position of the image seen by the pilot in azimuth. The lengths of the links 36 and 37 are adjusted together to adjust the position of the image in elevation. Finally, the length of the link 37 is adjusted to adjust the roll attitude of the image. It will be appreciated that by reason of the disposition of the links relative to the axes A, E and R the coupling between the azimuth, elevation and roll adjustments is very small, so that adjustment of all three variables may be accomplished quickly. After adjustment of the links, the mounting means is clamped by the spherical clamp 31 as described above.

I claim:

1. A mounting means for a display unit, said unit including fixing means for securing the mounting means to an associated assembly; said fixing means comprising:
   A. a bearing which serves to constrain the mounting means, when secured to the associated assembly, to rotational movement about a center fixed with respect to the associated assembly; and
   B. three links of adjustable length each attached at one end to the mounting means and at the other end to the associated assembly,
      i. two of said links extending substantially parallel to one another in directions substantially at right angles to and spaced from a first of three mutually perpendicular axes passing through said center of rotation so that rotation of the mounting means about said first axis is controllable by adjustment of the lengths of both said two links together,
      ii. one only of said two links extending in a direction substantially cutting a second of said axes so that rotation of the mounting means about said second axis is controllable by adjustment of the other of said two links alone, and
      iii. the third link extending in a direction substantially at right angles to and spaced from the third of said axes so that rotation of the mounting means about said third axis is controllable by adjustment of the length of said third link alone.

2. A mounting means according to claim 1 wherein said bearing comprises a globe and a co-operating spherical housing for the globe.

3. A mounting means according to claim 1 wherein said fixing means further includes a clamp for clamping the mounting means into position with respect to the associated assembly after adjustment by means of said links.

4. A mounting means according to claim 1 in combination with an aircraft head-up display unit, the mounting means serving to secure the display unit to the airframe of the aircraft so that said three axes are respectively the axes about which the display unit must be rotated to change the azimuth elevation and roll of the image presented to the pilot by the display unit.

* * * * *